United States Patent
Paquin et al.

(10) Patent No.: US 12,405,876 B2
(45) Date of Patent: Sep. 2, 2025

(54) PROACTIVELY IDENTIFYING ERRORS IN TECHNICAL DOCUMENTATION CODE

(71) Applicant: INTERNATIONAL BUSINESS MACHINES CORPORATION, Armonk, NY (US)

(72) Inventors: Robert Paquin, Poughkeepsie, NY (US); Cristina Olivia McComic, San Francisco, CA (US); Rita Beisel, Saugerties, NY (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 18/180,229

(22) Filed: Mar. 8, 2023

(65) Prior Publication Data

US 2024/0303178 A1 Sep. 12, 2024

(51) Int. Cl.
G06F 11/3604 (2025.01)
G06F 8/10 (2018.01)

(52) U.S. Cl.
CPC ............ *G06F 11/3608* (2013.01); *G06F 8/10* (2013.01)

(58) Field of Classification Search
USPC ....................................................... 717/126
See application file for complete search history.

(56) References Cited

U.S. PATENT DOCUMENTS

| | | |
|---|---|---|
| 7,565,282 B2 | 7/2009 | Carus |
| 8,666,742 B2 | 3/2014 | Detlef |
| 9,465,793 B2 | 10/2016 | Hoover |

(Continued)

FOREIGN PATENT DOCUMENTS

| | | |
|---|---|---|
| CN | 109766538 A | 5/2019 |
| CN | 109885828 A | 6/2019 |

(Continued)

OTHER PUBLICATIONS

Nishant Sharma; "Deep Learning for XML"; github.com website [full URL listed in ref.]; Feb. 22, 2019 (Year: 2019).*
Valuates Reports, "Web Content Management Market Size to Reach USD 17510 Million by 2028 at a CAGR of 13.7%", PRNewswire. com, Mar. 23, 2022, 7 Pages, <https://www.prnewswire.com/news-releases/web-content-management-market-size-to-reach-u[...]-by-2028-at-a-cagr-of-13-7—valuates-reports-301509018.html>.

*Primary Examiner* — Kenneth Tang
*Assistant Examiner* — Clint Thatcher
(74) *Attorney, Agent, or Firm* — Steven M. Bouknight

(57) ABSTRACT

An embodiment for a method of using machine learning algorithms to proactively identify potential errors in code instance data for creating technical documentation. The embodiment may receive code instance data. The embodiment may generate error classifications for the received code instance data using a convolutional neural network and natural language processing techniques. The embodiment may perform a correlation analysis to derive correlations between the generated error classifications for the received code instance data and similarly occurring classifications in one or more historical code instances. The embodiment may calculate a score for each of the derived correlations, the calculated score corresponding to a likelihood that the similarly occurring classifications in the one or more other code instances represents a potential error. The embodiment may output notifications to a user for each of the derived correlations for which the calculated score exceeds a threshold value.

20 Claims, 3 Drawing Sheets

(56) References Cited

U.S. PATENT DOCUMENTS

| | | | |
|---|---|---|---|
| 10,474,751 B2 | 11/2019 | Pino | |
| 11,170,166 B2 | 11/2021 | Bellegarda | |
| 11,314,921 B2 | 4/2022 | Yang | |
| 11,580,009 B2* | 2/2023 | Plawecki | G06F 8/70 |
| 11,900,229 B1* | 2/2024 | Swope | G06N 5/01 |
| 2009/0210861 A1 | 8/2009 | Alupului | |
| 2014/0279745 A1* | 9/2014 | Esponda | G06N 5/043 |
| | | | 706/12 |
| 2018/0268015 A1 | 9/2018 | Sugaberry | |
| 2020/0401768 A1* | 12/2020 | Freeman | G06F 40/30 |
| 2021/0004356 A1* | 1/2021 | Trim | G06F 40/197 |
| 2022/0179764 A1* | 6/2022 | Chan | G06F 11/0778 |

FOREIGN PATENT DOCUMENTS

| | | |
|---|---|---|
| CN | 110619119 A | 12/2019 |
| CN | 112395864 B | 4/2021 |

* cited by examiner

PROACTIVELY IDENTIFYING ERRORS IN TECHNICAL DOCUMENTATION CODE

BACKGROUND

The present application relates generally to computers, and more particularly, to using machine learning algorithms to proactively identify potential errors in code instance data for creating technical documentation.

Technical documentation involves written materials that provide information and instructions on how to use a particular technology or software application. Many writers and content developers in the software space utilize tools and languages such as Darwin Information Typing Architecture (DITA), eXtensible markup language (XML), Markdown, etc. to generate code instance data to be transformed into output or display code that is ultimately used for creating technical documentation. Reviewing code instance data to ensure that no errors are contained in associated output or display code used for creating technical documentation is a common practice to ensure that writers and content developers avoid publishing flawed or problematic content.

SUMMARY

According to one embodiment, a method, computer system, and computer program product for using machine learning algorithms to proactively identify potential errors in code instance data for creating technical documentation is provided. The embodiment may include receiving code instance data. The embodiment may further include generating potential error classifications for the received code instance data using a convolutional neural network and natural language processing techniques. The embodiment may also include performing a correlation analysis to derive correlations between the generated potential error classifications for the received code instance data and similarly occurring classifications in one or more historical code instances. The embodiment may further include calculating a score for each of the derived correlations, the calculated score corresponding to a likelihood that the similarly occurring classifications in the one or more other code instances represents a potential error. The embodiment may also include outputting notifications to a user for each of the derived correlations for which the calculated score exceeds a threshold value.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
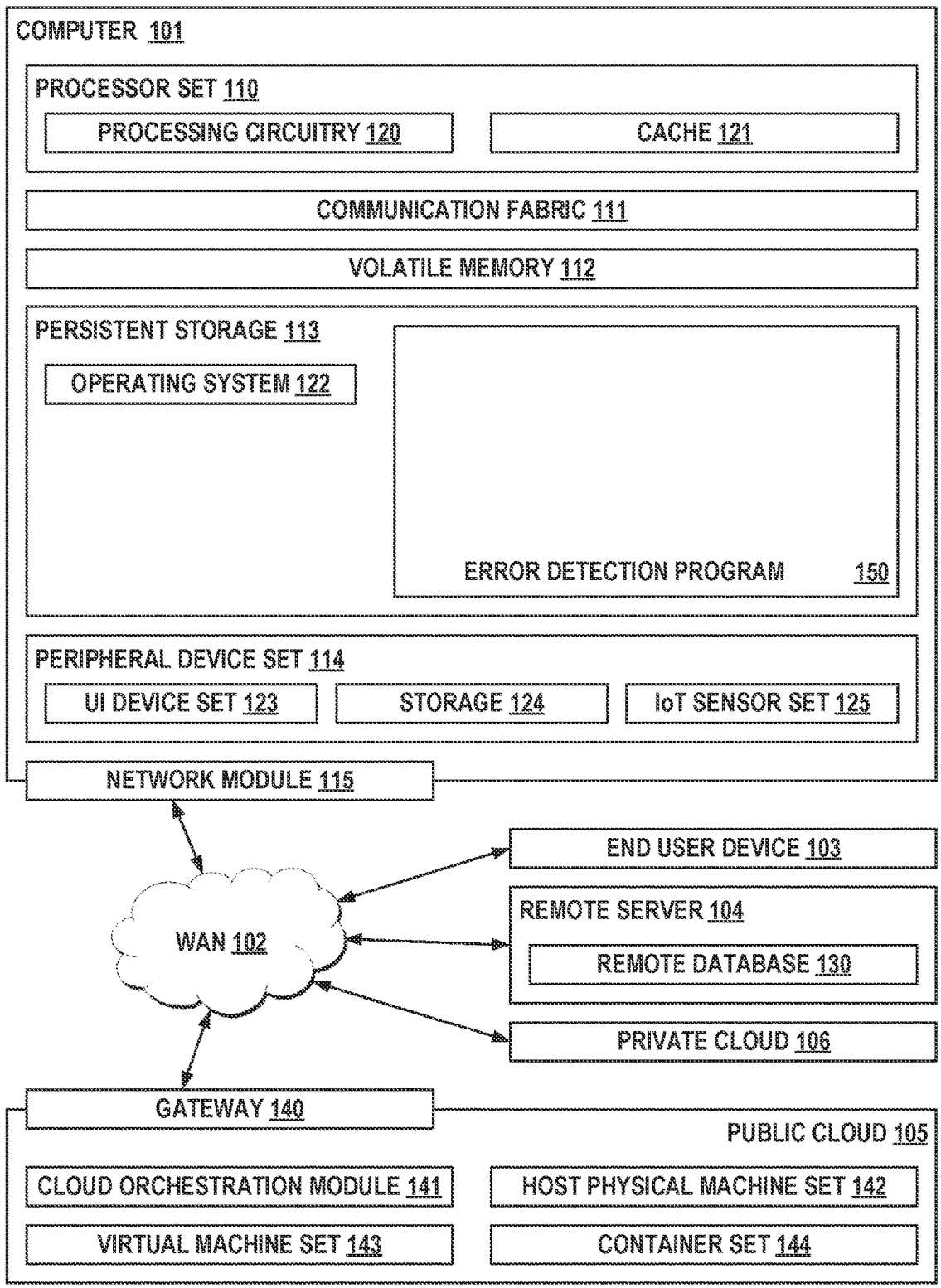
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computers, and more particularly, to using machine learning algorithms to proactively identify potential errors in code instance data for creating technical documentation. The following described exemplary embodiments provide a system, method, and program product to, among other things, receive code instance data, generate potential error classifications for the received code instance data using a convolutional neural network and natural language processing techniques, perform a correlation analysis to derive correlations between the generated potential error classifications for the received code instance data and similarly occurring classifications in one or more historical code instances, calculate a score for each of the derived correlations, the calculated score corresponding to a likelihood that the similarly occurring classifications in the one or more other code instances represents a potential error, and output notifications to a user for each of the derived correlations for which the calculated score exceeds a threshold value. Therefore, the presently described embodiments have the capacity to improve proactive identification of potential errors in technical documentation code. Presently described embodiments utilize a package of machine learning algorithms to automatically classify errors, derive correlations, and quantify, via a scoring system, common errors in technical documentation code. This removes the need for manual and time-intensive review processes and provides for improved accuracy of published documentation and a decreased likelihood of publishing errors by identifying the potential errors before publishing even occurs.

As previously described, technical documentation involves written materials that provide information and instructions on how to use a particular technology or software application. Many writers and content developers in the software space utilize tools and languages such as Darwin Information Typing Architecture (DITA), eXtensible markup language (XML), Markdown, etc. to generate code instance data to be transformed into output or display code that is ultimately useful for creating technical documentation. Reviewing code instance data to ensure that no errors are contained in associated output or display code used for creating technical documentation is a common practice to ensure that writers and content developers avoid publishing flawed or problematic content.

However, current practices for reviewing sources of code instance data for technical documentation creation typically involve a manual, time-intensive process that is subject to human error, and therefore, not completely reliable. This is partly because there are a large variety of potential errors that may occur within the code instance data. For example, code instance data for creation of technical documentation may include extraneous text that appears because of a bug in the transforms or tagging process, instance of inappropriate, offensive, or outdated wording, information that is usually hidden, such as comments within the source, content that has missing application plugins, or even content that is prematurely released about new feature or functions that have yet to be announced. These are only a few examples of the large variety of errors that may be discoverable within code instance data for technical documentation creation. Because customer experience can be heavily reliant on preventing these errors from being present after publication has occurred, it would be advantageous to detect potential errors in the code instance data before it is transformed into output or display code that may subsequently be published.

Accordingly, a method, computer system, and computer program product for improving proactive identification of potential errors in code instance data for creating technical documentation is provided. The method, system, and computer program product may receive code instance data The method, system, computer program product may generate potential error classifications for the received code instance data using a convolutional neural network and natural language processing techniques. The method, system, computer program product may then perform a correlation analysis to derive correlations between the generated potential error classifications for the received code instance data and similarly occurring classifications in one or more historical code instances. The method, system, computer program product may calculate a score for each of the derived correlations, the calculated score corresponding to a likelihood that the similarly occurring classifications in the one or more other code instances represents a potential error. Thereafter, the method, system, computer program product may output notifications to a user for each of the derived correlations for which the calculated score exceeds a threshold value. In turn, the method, system, computer program product has provided for improved proactive identification of potential errors in technical documentation code. Described embodiments utilize a package of machine learning algorithms to automatically classify errors, derive correlations, and quantify, via a scoring system, potential errors in technical documentation code. This removes the need for manual and time-intensive review processes and provides for improved accuracy of published documentation and a decreased likelihood of publishing errors by identifying the potential errors before publishing even occurs. Furthermore, presently described embodiments remove any concerns related to human error experienced during manual review, and instead rely upon machine learning to identify errors using historical data, allowing for constant learning and improvement in detecting and predicting potential errors over time as more data is processed, stored, and ultimately available for future error detection.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as error detection program/code 150. In addition to error detection code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and error detection code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in error detection code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in error detection code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the error detection program 150 may be a program capable of receiving code instance data. Error detection program 150 may generate potential error classifications for the received code instance data using a convolutional neural network and natural language processing techniques. Next, error detection program 150 may perform a correlation analysis to derive correlations between the generated potential error classifications for the received code instance data and similarly occurring classifications in one or more historical code instances. Error detection program 150 may then calculate a score for each of the derived correlations, the calculated score corresponding to a likelihood that the similarly occurring classifications in the one or more other code instances represents a potential error. Thereafter, error detection program 150 may output notifications to a user for each of the derived correlations for which the calculated score exceeds a threshold value. Described embodiments thus provide for improved proactive identification of potential errors in technical documentation code. Described embodiments utilize a package of machine learning algorithms to automatically classify errors, derive correlations, and quantify, via a scoring system, common errors in technical documentation code. This removes the need for manual and time-intensive review processes and provides for improved accuracy of published documentation and a decreased likelihood of publishing errors by identifying the potential errors before publishing even occurs. Furthermore, presently described embodiments remove any concerns related to human error experienced during manual review, and instead rely upon machine learning to identify errors using historical data, allowing for constant learning and improvement in detecting potential errors over time as more data is processed, stored, and ultimately available for future error detection.

Figure 2:
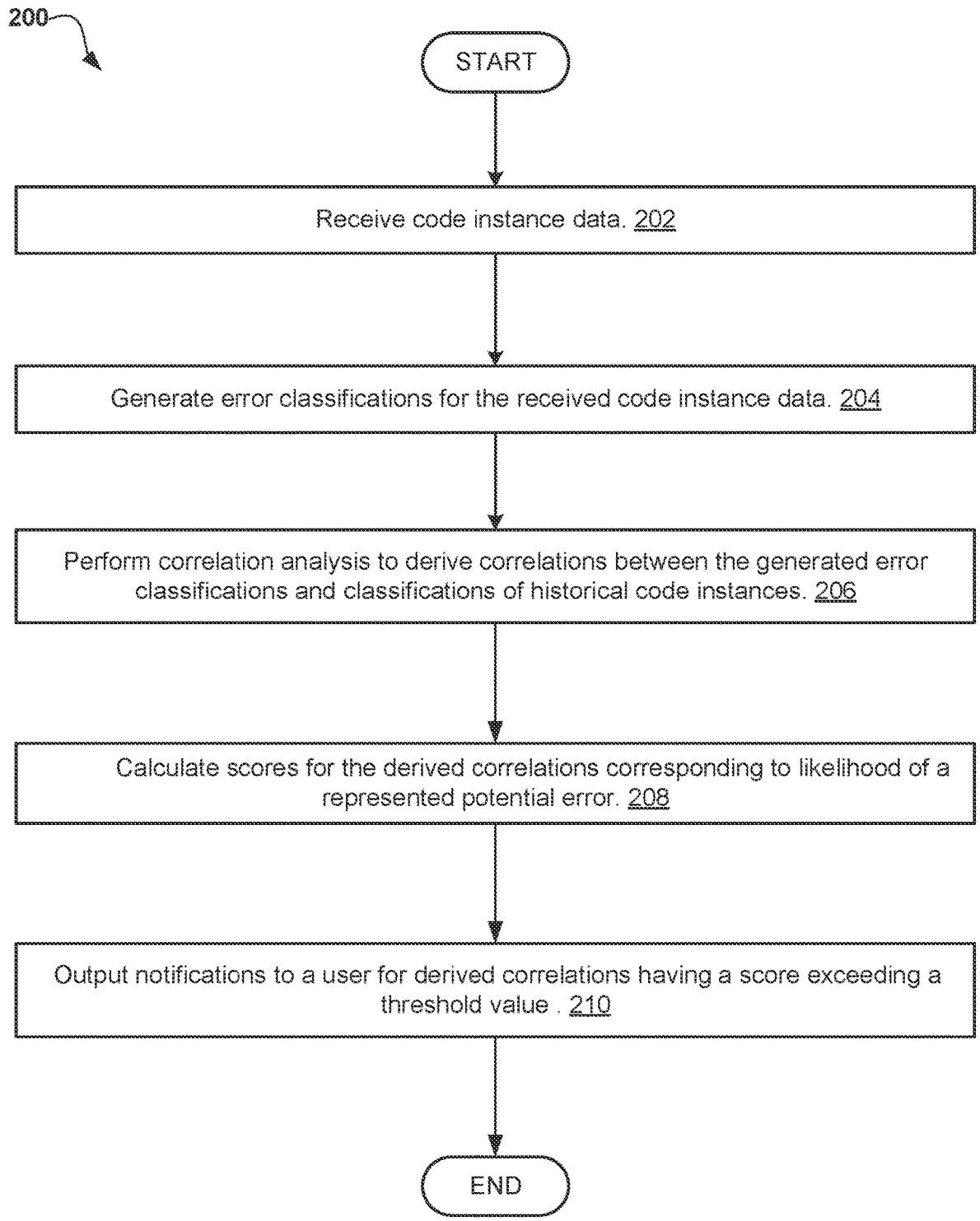
FIG. 2 illustrates an operational flowchart for a process of using machine learning algorithms to proactively identify potential errors in technical documentation code according to at least one embodiment.

Referring now to FIG. 2, an operational flowchart is provided depicting an illustrative process 200 of using machine learning algorithms to proactively identify potential errors in code instance data for creating technical documentation.

Figure 3:
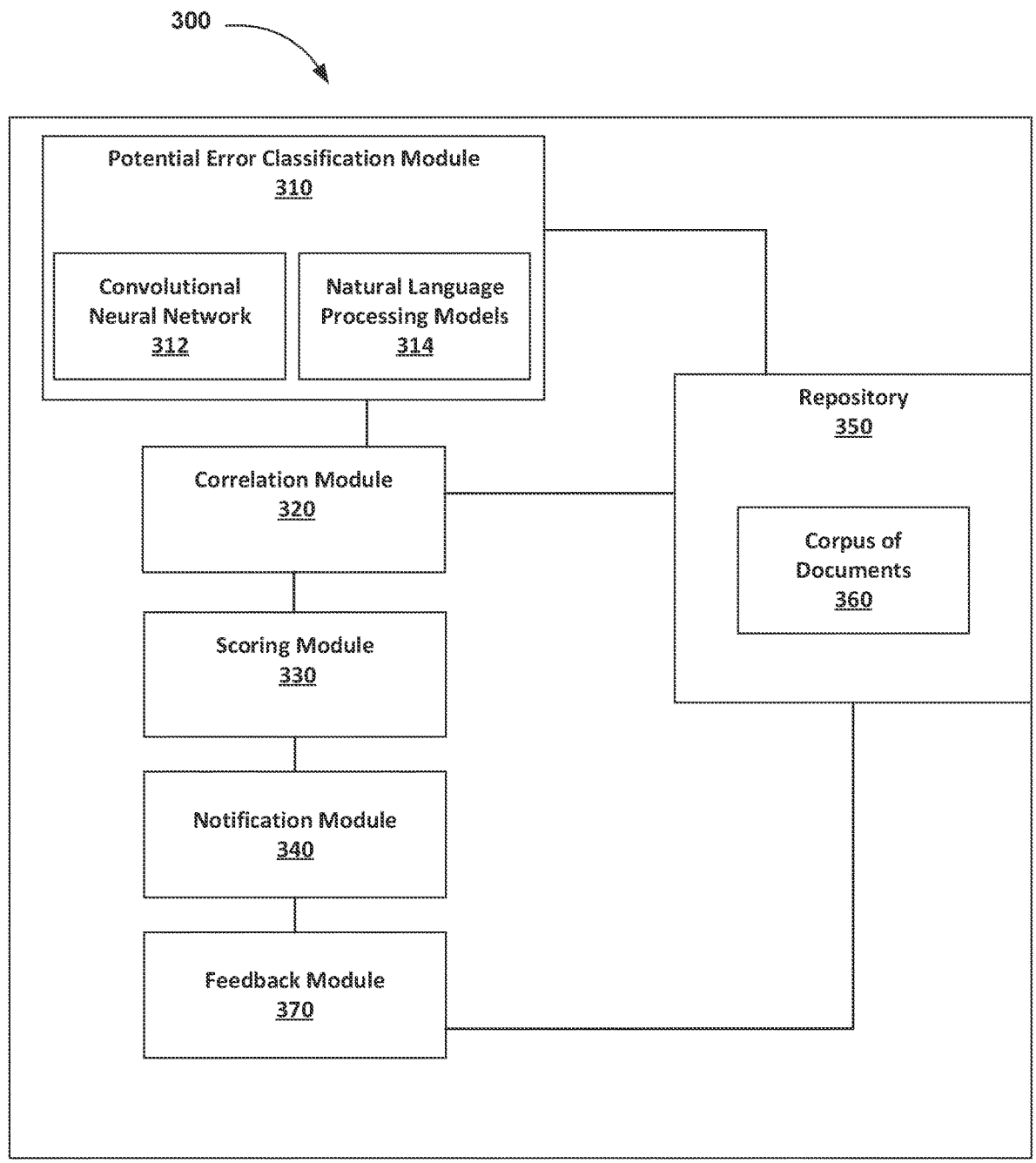
FIG. 3 illustrates exemplary system architecture that may be used in performing a process of using machine learning algorithms to proactively identify potential errors in technical documentation code according to at least one embodiment.

FIG. 3 depicts exemplary system architecture 300 that may be used in performing a process of using machine learning algorithms to identify potential errors in code instance data for creating technical documentation according to at least one embodiment. As shown in FIG. 3, and exemplary error detection program may include a repository 350. Repository 350 may include a corpus of historical documents 360 containing annotated documents including code instance data having known classifications (including error classifications). In embodiments, the corpus of historical documents 360 stored within repository 350 may be derived from a publicly available corpus. In other embodiments, the corpus of historical documents 360 may be manually annotated and processed (by a user or entity employing described embodiments) before being stored in repository 350. In other instances, historical documents 360 may include documents for which an exemplary error detection program 150 has performed potential error classification and correlation analysis steps to identify and store documents containing additional instances of errors from which exemplary error detection program 150 may continuously learn.

As further shown in FIG. 3, system architecture 300 may further include a potential error classification module 310 configured to generate potential error classifications for received code instance data, in part, using the corpus of documents 360 within repository 350, and subsequently store the generated potential error classifications within repository 350. Potential error classification module 310 may further include a convolutional neural network 312 and natural language processing models 314. System architecture 300 may further include a correlation module 320 configured to perform a correlation analysis to derive correlations between the generated potential error classifications for the received code instance data and similarly occurring classifications in the corpus of documents 360 within repository 350. System architecture 300 may further include a scoring module 330 to calculate a score for each of the derived correlations, the calculated score corresponding to a likelihood that the similarly occurring classifications contained in the corpus of documents 360 may represent a potential error. Lastly, system architecture 300 may include a notification module 340 configured to output notifications to a user for each of the derived correlations for which the calculated score exceeds a threshold value. Exemplary system architecture 300 will be referenced and further discussed in greater detail below regarding the description of illustrative process 200.

Returning to the discussion of illustrative process 200 shown in FIG. 2, at 202, error detection program 150 may receive code instance data. In the context of this disclosure, code instance data refers to any instances of code or languages for writing software that may be used as at an input source for ultimately producing any amount of technical documentation as a final output. For example, code instance data receivable by error detection program 150 may include code or language written in any suitable markup language. The received code instance data received by error detection program 150 may be within received documents written using any suitable structured content framework for creating technical documentation, such as for example, Darwin Information Typing Architecture (DITA) or DocBook. For example, in embodiments, the received code instance data may be included within a received DITA document. The received code instance data may further be written in any suitable or known languages that may serve as an input source for ultimately creating any amount of technical documentation as an output, such as, for example, eXtensible markup language (XML) or Markdown. Error detection program 150 may receive code instanced data as an input to detect potential errors that may be present once it is transformed into an exemplary output or display format, such as, for example, portable document format (PDF), hypertext markup language (HTML), or other suitable output formats. The output or display code may then be used to publish the final technical documentation. Accordingly, error detection program 150 forecasts and predicts the presence of errors before the technical documentation associated with the received code instance data becomes published, as will be discussed in greater detail below.

Next, at 204, error detection program 150 may generate potential error classifications for the received code instance data using a convolutional neural network (CNN) and natural language processing (NLP) techniques. For example, if an exemplary error detection program 150 having illustrative system architecture as shown in FIG. 3 receives code instance data at step 202 from an exemplary DITA document 'D1', error detection program 150 may utilize a classification module 310 to generate potential error classifications for the code instance data contained within 'D1' using the above-referenced machine learning techniques by comparing document 'D1' to the corpus of documents 360 contained in the accessible repository 350. To accomplish this, error detection program 150 may be configured to utilize CNN 312. Although a CNN is typically used to classify images and derive objects, the pattern matching capabilities of a CNN can also be applied by error detection program 150 to identify patterns in specific keywords and text. Additionally, the presence of images and diagrams in code instance data can be analyzed by the CNN to identify potential errors. At this step, error detection program 150 may further utilize natural language processing models 314 to leverage natural language processing algorithms to generate further code instance potential error classifications for 'D1' by analyzing the human language data contained therein. This may include processing the structure of words, their meaning, and how they are used in phrases and sentences to identify potential errors and perform classification. For example, error detection program 150 may utilize exemplary NLP algorithms at this step to identify incorrect uses of terms or words that are spelled incorrectly. In embodiments, error detection program 150 may store the generated potential error classifications for the received code instance data in repository 350. This allows error detection program 150 to continuously build an increasing amount of available code instance data and documents with associated potential error classifications to leverage to make increasingly accurate determinations and predictions of likely errors present in newly received code instance data.

At 206, error detection program 150 may perform a correlation analysis to derive correlations between the generated potential error classifications for the received code instance data and similarly occurring classifications in one or more historical code instances. To accomplish this, an illustrative error detection program 150, having system architecture as shown in FIG. 3, may be configured to leverage the corpus of documents 360 containing historical code instance data error classifications to derive correlations between the potential error classifications for the received code instance data generated at step 204 and the error classifications associated with the corpus of documents 360 using a correlation module 320. For example, at this step error detection program 150 may determine that a generated potential error classification corresponding to received instance code data is based on an exemplary occurrence or feature 'X' which is similar to an error classification corresponding to an exemplary occurrence or feature 'Y' within a segment of code instance data from a historical document in repository 350. If 'Y' was identified as being associated with an error in the past, it may be predicted by error detection program 150 that 'X' is also likely associated with a same or similar error.

Correlation module 320 of error detection program 150 may perform the correlation analysis using any suitable technique. For example, in embodiments, the correlation analysis may involve a K-Nearest Neighbors (kNN) analysis. For embodiments in which error detection program 150 uses kNN techniques, the distance between the instances may be calculated using a metric, such as Euclidean distance. The kNN algorithm would then find the k nearest neighbors for each instance in the training set and build models that predict the classes of unknown instances by averaging the classes of their nearest neighbors. For example, the presence of a particular phrase in a given potential error classification may be highly correlated to a prior identified bug in the tagging process or indicate an author comment that was intended to be hidden from final publication.

In other embodiments, the correlation analysis performed by error detection program 150 may involve learning vector quantization (LVQ) techniques. In such embodiments, a supervised neural network algorithm may be used to find a smaller set of prototype vectors for each class in the training data. These prototypes are then used to classify new data. An advantage of using LVQ techniques is that they can handle high dimensional data sets, such as code instance data, without losing information. For example, two classifications may be close together in terms of Euclidean distance but may be far apart in terms of the number of dimensions. In the context of code instance data, this may indicate that while the two classifications are similar, they are not actually indicative of an error.

In embodiments the correlation analysis performed by error detection program 150 may involve the use of support vector machines (SVM). SVM utilizes a type of supervised learning algorithm that can be used to identify patterns in high dimensional data sets. In the context of code instance data, SVM may be used to find clusters of similar classifications.

In embodiments, error detection program 150 may be further configured to employ learning vector quantization (LVQ) to choose training instances to preserve and to reduce the memory requirement for storing entire training datasets.

Once error detection program 150 has performed a correlation analysis to derive correlations between the generated potential error classifications for the received code instance data and similarly occurring classifications in one or more historical code instances using one or more of the above-described techniques, the derived correlations associated with the received code instance data may also be stored in the repository 350.

Next, at 208, error detection program 150 may calculate a score for each of the derived correlations, the calculated score corresponding to a likelihood that the similarly occurring classifications in the one or more other code instances represents a potential error. In embodiments, error detection program 150 may further calculate a confidence level for each calculated score. The calculated confidence level may be based upon the availability and quality of data used to calculate the score associated with a given derived correlation. In embodiments, an exemplary error detection program 150 having architecture as shown in FIG. 3 may utilize a scoring module 330 to calculate and assign a score to each derived correlation. Scoring module 330 of error detection program 150 may calculate scores using any suitable scoring techniques. In some embodiments, error detection program 150 may calculate scores using methods including Bayesian Belief Networks (BBN). A BBN is a graphical model that represents a set of random variables and the conditional dependencies between them. In the context of the received code instance data, a BBN may be used to represent the relationships between the generated classifications. This allows error detection program 150 to calculate the probability that a given potential error classification is likely associated with an error. In other embodiments, scoring module 330 of error detection program 150 may calculate scores using Naive Bayes algorithms. This involves probabilistic classification algorithms that may be used to calculate the probability that a given potential error classification is indeed an error. Exemplary Naive Bayes algorithms may be based on the assumption that each feature in the data set is independent of each other feature. This assumption is not always true in practice, but provides a starting point for many classification problems. Accordingly, Naïve Bayes algorithms may be leveraged for scoring each derived correlation. In embodiments, the calculated score may be a numerical representation of the likelihood that a potential error classification is indeed an error. For example, an illustrative numerical range for scores calculated by error detection program 150 may ranges from 0 to 10, where numbers closer to 10 correspond to higher confidence that the potential error classification corresponds to an error, and numbers closer to 0 corresponds to lesser confidence that the potential error classification corresponds to an error.

As mentioned above, for each calculated score error detection program 150 may further calculate a confidence level. In embodiments, the confidence level may be a numerical representation of the quality and quantity of available and applicable data (contained within an available corpus of documents in the repository) used to calculate the score. In embodiments the confidence level may be represented on a numerical scale in a similar manner to the calculated scores. For example, an exemplary numerical scale for confidence levels may include a scale in which numbers closer to 0 represent low confidence, while numbers closer to 10 represent high confidence. For example, if error detection program 150 calculates a score of 9.5 for a derived correlation 'DC 1' predicted to correspond to an error based upon similar classifications contained within a singular unverified document within the historical data in the repository, a numerical confidence level of less than 5 maybe generated. However, in another example, error detection program 150 may calculates a score of 9.5 for a derived correlation 'DC 2' predicted to correspond to an error based upon 20 similar classifications contained within 20 different manually annotated documents contained within the historical data in the repository. In this instance, error detection program 150 may calculate a confidence score of 9.9 as the quality and availability of applicable historical data was comparatively high.

Thereafter, at 210, error detection program 150 may output notifications to a user for each of the derived correlations for which the calculated score exceeds a threshold value. In embodiments, error detection program 150 may be preconfigured to output notifications based on pre-defined threshold values for either the calculated score, an associated confidence level, or both. For example, in an embodiment in which error detection program 150 calculates numeric scores between 0-10 for the calculated scores associated with the derived correlations and confidence scores between 0-10, error detection program 150 may be configured to output notifications to a user for each of the derived correlations for which the calculated score exceeds a threshold value of 8.0. Error detection program 150 may output the notifications to users using any suitable notifications means, such as, for example, email, markup, or webhook. In embodiments, the notifications output by error detection program 150 may include a variety of information, such as, for example, the error associated with each derived correlation, the calculated score for each derived correlation, the associated confidence level for each derived correlation, a link to the relevant code instance data for each derived correlation, and any other useful information that may be of interest to a user receiving the notification.

In embodiments, error notification program may further include an error feedback module 370 configured to provide for a feedback loop within error detection program 150. For example, an exemplary error feedback module 370 may be configured to allow a user to manually provide feedback indicating whether the identified errors for which notifications were received included an actual error. This feedback may then be used by error detection program 150 to continuously learn and improve the scoring system discussed above in future iterations of forecasting and scoring potential error classifications.

It will be appreciated that error detection program 150 thus provides for improved proactive identification of potential errors in technical documentation code. Described embodiments provide a mechanism to avoid manual, time-intensive, and costly reviewing processes for source code (code instance data) for creating technical documentation. Described embodiments receive code instance data and classify the data using a CNN and natural language processing techniques to then correlate the classifications to previously determined classifications associated with known errors that are stored within a corpus of historical documents and code instance data. From these correlations, described embodiments may draw insights and use scoring systems to determine the likelihood of a potential error being an actual error along with a corresponding determination of confidence level. Over time, feedback loops and increasing data availability allow described embodiments to continuously improve at potential error identification and predictive accuracy regarding the likelihood that those potential errors are indeed actual errors. By outputting notifications of likely errors to users, described embodiments thus provides content creators with the ability to investigate the forecasted errors to address the errors before publication. The ability to forecast these potential errors from code instance data that has not yet been transformed to an output or display code, and thus has not yet been published as finalized technical documentation, provides significant value to many writers and content creators.

It may further be appreciated that described embodiments provide for several potential use cases related to forecasting of potential errors. For example, it is envisioned that in embodiments, error detection program 150 may allow for prevention of errors involving pre-announcing products or features before they are publicly released by using described machine learning algorithms to spot certain keywords associated with unannounced products or features. In other embodiments, error detection program 150 may be utilized to spot discrepancies between input code (for example within a DITA document) and out/display code (PDF, HTML, etc.) which can result in mismatched content or extraneous text. For example, segments of extraneous and unwanted "Page First" and "Page Last" text may appear in a code block or message block in HTML due to certain tagging (Otherprops, revision, etc). These errors may not appear in a PDF format or in the DITA source and only appear in HTML. Using error detection program 150 to determine discrepancies between the DITA format and the HTML format would decrease the likelihood of these extraneous and unwanted text appearing. In other embodiments, error detection program 150 may be used to prevent offensive terms or undesired words to be published by using the described machine learning algorithms to manually identify keywords associated with such terms. In other embodiments error detection program 150 may be used to derive when some part of received code instance data is typically not shown, but is formatted such that it is being shown within the received code instance data. For example, if text within a comment tag (which is not shown historically) is now turned on to show in the to-be published content, the discussed machine learning algorithms will spot this discrepancy and notify the writer before they publish the documentation. In yet another embodiment, error detection program 150 may be used to prevent faulty HTML documentation builds and publishing by ensuring that the products or plugins that are usually available in the storage system (such Cloud Object Storage) are all there when it is time to rebuild and publish HTML to a documentation publication tool. For example, have the machine learning algorithm derive when a key plugin is not present in the testing instance, and therefore will not publish in the documentation publication tool's final version. This may function as an extra safeguard measure that will prevent faulty documentation builds or publications that have missing plugins or applications. The above-described use cases for error detection program 150 are merely a subset of illustrative examples. Many other use cases for forecasting potential errors using error detection program 150 are envisioned and may include any known use cases that may be performed by the above-discussed algorithms.

It may be appreciated that FIG. 2 provides only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of proactively identifying potential errors in code instance data for creating technical documentation comprising:

receiving code instance data;

generating potential error classifications for the received code instance data using a convolutional neural network and natural language processing techniques, wherein using the convolution neural network and the natural language processing techniques further comprises applying algorithms including pattern matching to identify patterns in specific keywords and text, image and diagram processing to identify the potential errors in images and diagrams, and word structure processing to determine word meaning and use in phrases and sentences to further identify the potential errors;

training one or more machine learning (ML) algorithms to perform a correlation analysis to derive correlations between the generated potential error classifications for the received code instance data and similarly occurring classifications in one or more historical code instances;

calculating a score for each of the derived correlations from the trained one or more ML algorithms, the calculated score corresponding to a likelihood that the received code instance data is correlated to the similarly occurring classifications and represents a potential error; and outputting notifications to a user for each of the derived correlations based on a predefined threshold value for the calculated score, further comprising outputting a notification for a derived correlation based on the calculated score for the derived correlation exceeding the predefined threshold value, and wherein the outputting further comprises generating and providing a link to the code instance data for the derived correlation.

2. The computer-based method of claim 1, wherein the correlation analysis is performed using at least one of a K-nearest neighbor algorithm, a learning vector quantization algorithm, and support vector machines.

3. The computer-based method of claim 1, wherein generating the potential error classifications for the received code instance data using the convolutional neural network and the natural language processing techniques further comprises:

comparing the received code instance data to a corpus of documents stored within an accessible repository of historical code instance data.

4. The computer-based method of claim 1, wherein the calculated scores are calculated using at least one of a bayesian belief network and a naive bayes classification algorithm.

5. The computer-based method of claim 1, wherein calculating the score for each of the derived correlations, the calculated score corresponding to the likelihood that the similarly occurring classifications in the one or more other code instances represents the potential error further comprises:

calculating a confidence level for each of the derived correlations, wherein the confidence level is dependent upon a quantity and a quality of available applicable historical code instance data considered.

6. The computer-based method of claim 1, wherein the received code instance data comprises one or more documents written using at least one of Darwin Information Typing Architecture (DITA), extensible markup language (XML), and markdown.

7. The computer-based method of claim 1, wherein the received code instance data is extracted from a document written using Darwin Information Typing Architecture (DITA) as a structured content framework.

8. A computer system, the computer system comprising:
one or more processors, one or more computer-readable memories, one or more computer-readable storage media, and program instructions stored on at least one of the one or more computer-readable storage media for execution by at least one of the one or more processors via at least one of the one or more computer-readable memories, wherein the computer system is capable of performing a method comprising:

receiving code instance data;

generating potential error classifications for the received code instance data using a convolutional neural network and natural language processing techniques, wherein using the convolution neural network and the natural language processing techniques further comprises applying algorithms including pattern matching to identify patterns in specific keywords and text, image and diagram processing to identify the potential errors in images and diagrams, and word structure processing to determine word meaning and use in phrases and sentences to further identify the potential errors;

training one or more machine learning (ML) algorithms to perform a correlation analysis to derive correlations between the generated potential error classifications for the received code instance data and similarly occurring classifications in one or more historical code instances;

calculating a score for each of the derived correlations from the trained one or more ML algorithms, the calculated score corresponding to a likelihood that the received code instance data is correlated to the similarly occurring classifications and represents a potential error; and outputting notifications to a user for each of the derived correlations based on a predefined threshold value for the calculated score, further comprising outputting a notification for a derived correlation based on the calculated score for the derived correlation exceeding the predefined threshold value, and wherein the outputting further comprises generating and providing a link to the code instance data for the derived correlation.

9. The computer system of claim 8, wherein the correlation analysis is performed using at least one of a K-nearest neighbor algorithm, a learning vector quantization algorithm, and support vector machines.

10. The computer system of claim 8, wherein generating the potential error classifications for the received code instance data using the convolutional neural network and the natural language processing techniques further comprises:

comparing the received code instance data to a corpus of documents stored within an accessible repository of historical code instance data.

11. The computer system of claim 8, wherein the calculated scores are calculated using at least one of a bayesian belief network and a naive bayes classification algorithm.

12. The computer system of claim 8, wherein calculating the score for each of the derived correlations, the calculated score corresponding to the likelihood that the similarly occurring classifications in the one or more other code instances represents the potential error further comprises:

calculating a confidence level for each of the derived correlations, wherein the confidence level is dependent upon a quantity and a quality of available applicable historical code instance data considered.

13. The computer system of claim 8, wherein the received code instance data comprises one or more documents written using at least one of Darwin Information Typing Architecture (DITA), extensible markup language (XML), and markdown.

14. The computer system of claim 8, wherein the received code instance data is extracted from a document written using Darwin Information Typing Architecture (DITA) as a structured content framework.

15. A computer program product, the computer program product comprising:

one or more computer-readable storage media and program instructions stored on at least one of the one or more computer-readable storage media, the program instructions executable by a processor capable of performing a method, the method comprising:

receiving code instance data;

generating potential error classifications for the received code instance data using a convolutional neural network and natural language processing techniques, wherein using the convolution neural network and the natural language processing techniques further comprises applying algorithms including pattern matching to identify patterns in specific keywords and text, image and diagram processing to identify the potential errors in images and diagrams, and word structure processing to determine word meaning and use in phrases and sentences to further identify the potential errors;

training one or more machine learning (ML) algorithms to perform a correlation analysis to derive correlations between the generated potential error classifications for the received code instance data and similarly occurring classifications in one or more historical code instances;

calculating a score for each of the derived correlations from the trained one or more ML algorithms, the calculated score corresponding to a likelihood that the received code instance data is correlated to the similarly occurring classifications and represents a potential error; and outputting notifications to a user for each of the derived correlations based on a predefined threshold value for the calculated score, further comprising outputting a notification for a derived correlation based on the calculated score for the derived correlation exceeding the predefined threshold value, and wherein the outputting further comprises generating and providing a link to the code instance data for the derived correlation.

16. The computer program product of claim 15, wherein the correlation analysis is performed using at least one of a K-nearest neighbor algorithm, a learning vector quantization algorithm, and support vector machines.

17. The computer program product of claim 15, wherein generating the potential error classifications for the received code instance data using the convolutional neural network and the natural language processing techniques further comprises:

comparing the received code instance data to a corpus of documents stored within an accessible repository of historical code instance data.

18. The computer program product of claim 15, wherein the calculated scores are calculated using at least one of a bayesian belief network and a naive bayes classification algorithm.

19. The computer program product of claim 15, wherein calculating the score for each of the derived correlations, the calculated score corresponding to the likelihood that the similarly occurring classifications in the one or more other code instances represents the potential error further comprises:

calculating a confidence level for each of the derived correlations, wherein the confidence level is dependent upon a quantity and a quality of available applicable historical code instance data considered.

20. The computer program product of claim 15, wherein the received code instance data comprises one or more documents written using at least one of Darwin Information Typing Architecture (DITA), extensible markup language (XML), and markdown.

* * * * *